(12) United States Patent
Clausen et al.

(10) Patent No.: US 10,239,388 B2
(45) Date of Patent: Mar. 26, 2019

(54) IMPACT BEAM AND METHOD FOR PRODUCING AN IMPACT BEAM

(71) Applicant: Benteler Automobiltechnik GmbH, Paderborn (DE)

(72) Inventors: Edvin List Clausen, Lojt Kirkeby Abenra (DK); Andreas Hitz, Erwitte (DE); Tobias Svantesson Kavik, Oslo (NO); Amin Farjad Bastani, Gjovik (NO)

(73) Assignee: BENTELER AUTOBOBILTECHNIK GMBH, Paderborn (DE)

(*) Notice: Subject to any disclaimer, the term of this patent is extended or adjusted under 35 U.S.C. 154(b) by 0 days.

(21) Appl. No.: 15/411,715

(22) Filed: Jan. 20, 2017

(65) Prior Publication Data

US 2017/0210211 A1    Jul. 27, 2017

(30) Foreign Application Priority Data

Jan. 22, 2016  (DE) .................. 10 2016 101 150

(51) Int. Cl.
| | |
|---|---|
| *B60J 5/00* | (2006.01) |
| *B60J 5/04* | (2006.01) |
| *B60R 19/18* | (2006.01) |
| *B60R 19/34* | (2006.01) |
| *B62D 29/00* | (2006.01) |
| *B60R 19/02* | (2006.01) |

(52) U.S. Cl.
CPC ............ *B60J 5/0444* (2013.01); *B60R 19/18* (2013.01); *B60R 19/34* (2013.01); *B62D 29/008* (2013.01); *B60R 2019/182* (2013.01); *B60Y 2410/12* (2013.01)

(58) Field of Classification Search
CPC ....... B62D 29/008; B60R 19/34; B60R 19/18; B60R 2019/182; B60Y 2410/12
USPC ............... 296/146.6; 293/102, 120–122
See application file for complete search history.

(56) References Cited

U.S. PATENT DOCUMENTS

| | | | | |
|---|---|---|---|---|
| 5,540,016 A | * | 7/1996 | Clausen | B60J 5/0444 296/193.1 |
| 5,577,796 A | * | 11/1996 | Clausen | B60R 19/18 29/897.2 |
| 8,287,012 B2 | * | 10/2012 | Kokubo | B21D 53/88 293/102 |
| 8,499,607 B2 | | 8/2013 | Kleber et al. | |

FOREIGN PATENT DOCUMENTS

| | | |
|---|---|---|
| DE | 102014110320 A1 | 1/2016 |
| GB | 2333501 * | 7/1990 |
| WO | 0204253 A1 | 1/2002 |

* cited by examiner

*Primary Examiner* — Dennis H Pedder
(74) *Attorney, Agent, or Firm* — Hauptman Ham, LLP

(57) ABSTRACT

An impact beam and a method of producing the impact beam for a motor vehicle is disclosed. A light metal profile with an extrusion width is produced by flattening the light metal profile to a working width and cutting to length to form semi-finished products. The semi-finished products are subjected to further treatment by press-forming techniques to form the impact beam. The impact beam has a longitudinal length which extends transversely to the direction of extrusion of the light metal profile.

14 Claims, 4 Drawing Sheets

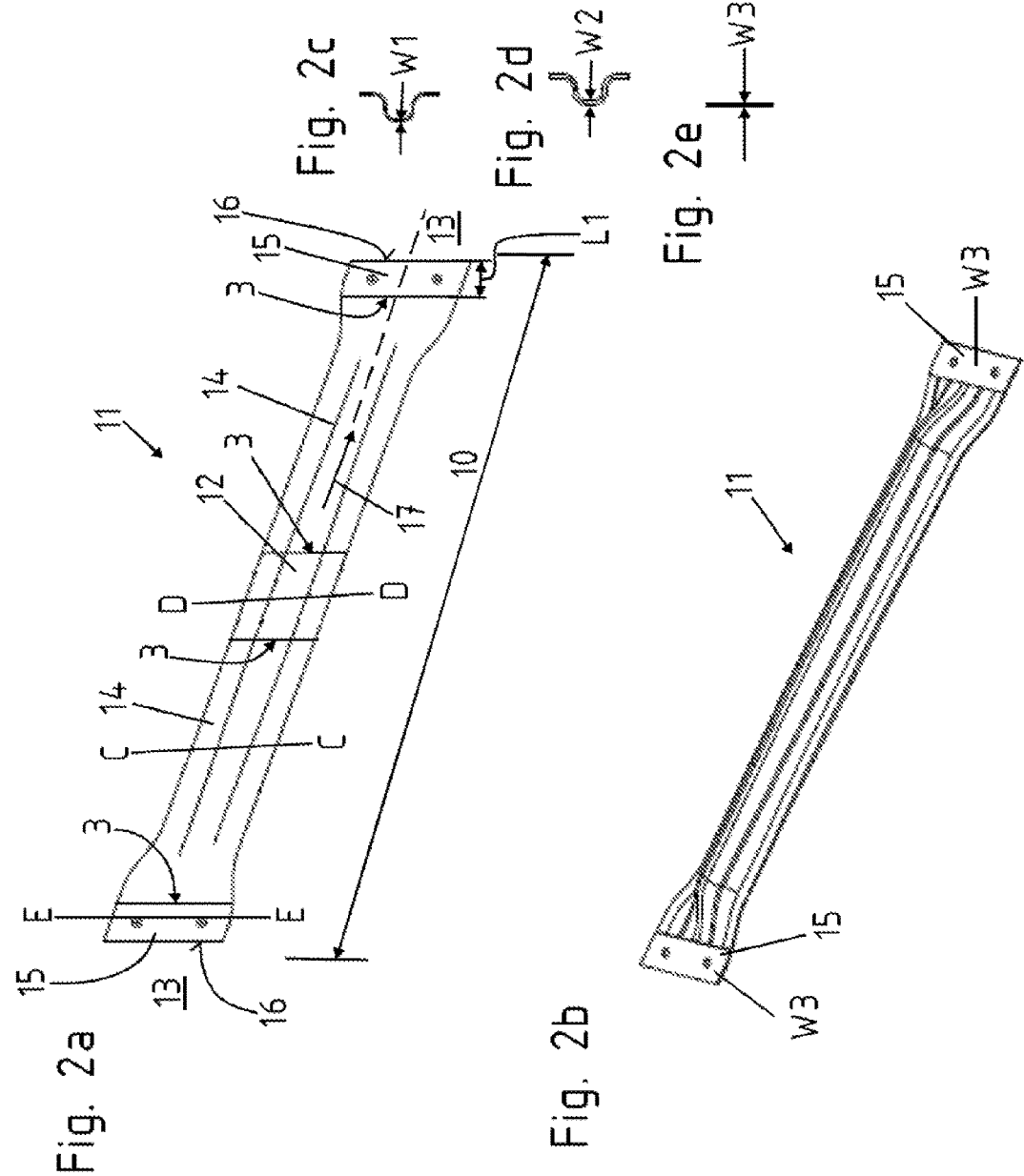

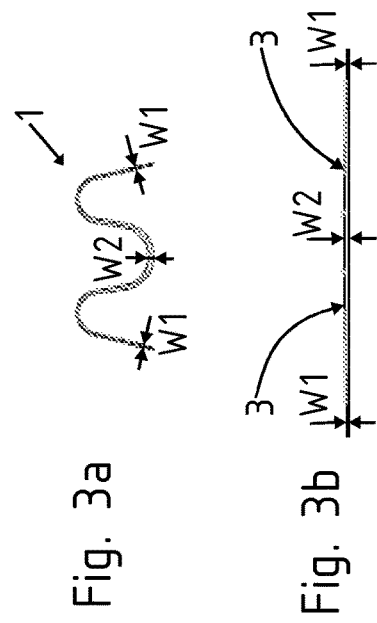
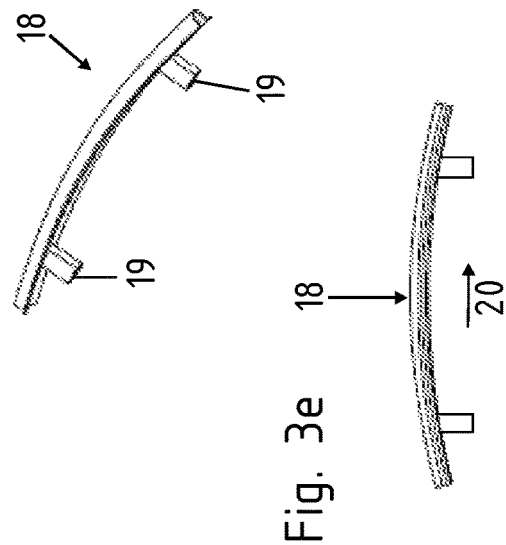
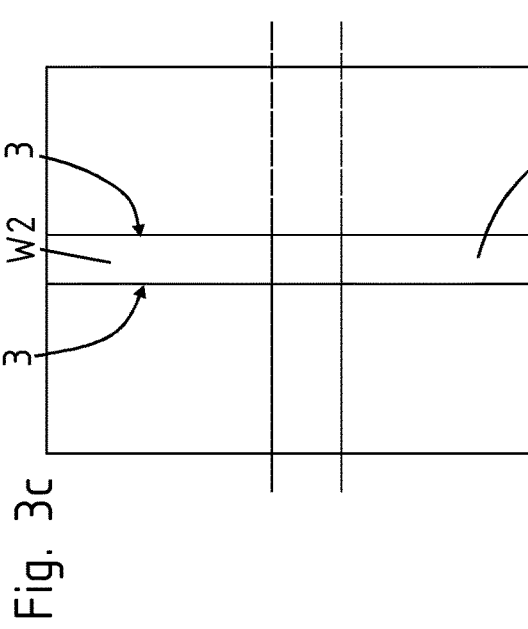
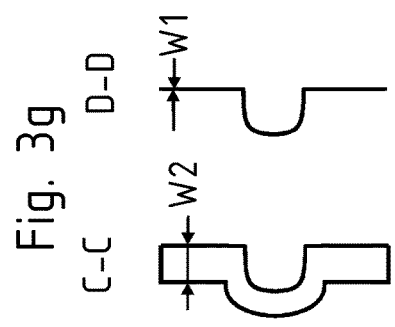
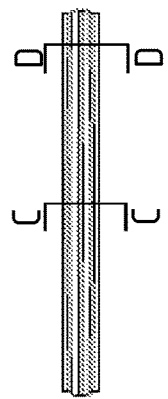
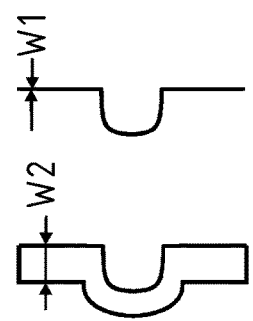

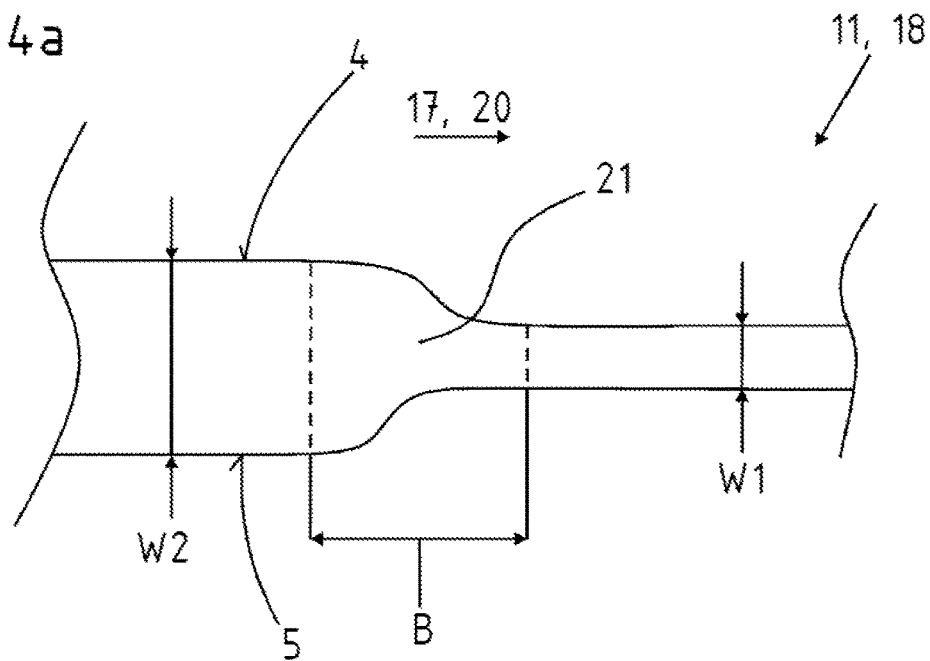
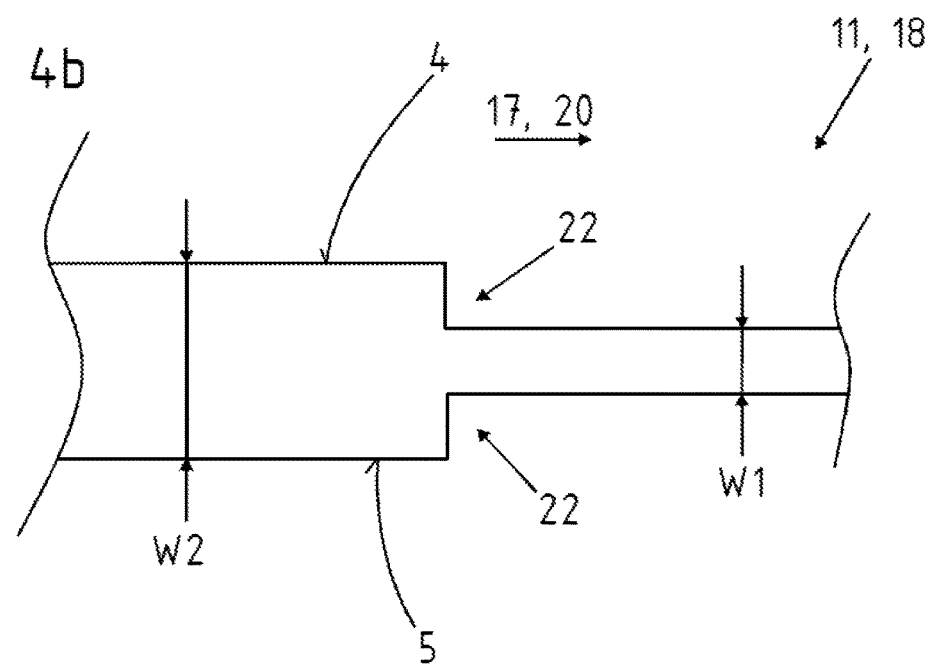

IMPACT BEAM AND METHOD FOR PRODUCING AN IMPACT BEAM

RELATED APPLICATIONS

The present application claims priority from German Patent Application Number 10 2016 101 150.9 filed Jan. 22, 2016, the disclosure of which is hereby incorporated by reference herein in its entirety.

FIELD OF THE INVENTION

The present invention relates to an impact beam according to the preamble of Claim 1.

The present invention further relates to a method for producing an impact beam according to the features in the preamble of Claim 11.

BACKGROUND OF THE INVENTION

From the prior art it is known to fit impact beams in motor vehicles in the region of points on the bodywork which are at risk of impact. These impact beams serve to conduct the force produced in the event of an impact in a targeted manner into a force path in order to keep the passenger compartment stable, therefore, and thus to protect the passengers. An impact beam is designed to be as rigid as possible. However, it is non-visible component, resulting in the requirements also being set that it is produced as cost-effectively as possible and at the same time has a low dead weight.

Such impact beams in the region of the vehicle front or vehicle rear are known as cross members or even fender supports. The cross members are configured as an elongated component and generally extend over a large part of the motor vehicle width. The longitudinal axis of the impact beam, therefore, is mainly oriented in the motor vehicle Y-direction. Such cross members are coupled either directly to longitudinal members arranged at the ends of the motor vehicle or indirectly by the insertion of crash boxes or impact absorbers.

In the region at the side of the motor vehicle, impact beams are known as door impact beams. These impact beams are mounted in the interior of a motor vehicle door and connect a hinge side to a lock side of the motor vehicle door. The door impact beams are also configured as an elongated component and extend with their longitudinal axis substantially in the motor vehicle longitudinal direction, thus in the motor vehicle X-direction and/or at a small angle thereto.

In addition to the production of these impact beams as a steel component by means of a sheet metal forming method, it is also known from the prior art to produce appropriate impact beams from a light metal alloy, in particular from an aluminum alloy. An impact beam generally has an open or closed hollow profile in cross section. In the open hollow profiles the cross sections are generally configured to be C-shaped, U-shaped or even hat-shaped. For producing such impact beams, it is either known to shape a prepared plate, in particular made from a light metal alloy, by press-forming techniques such that said plate is brought to the desired final geometry.

Moreover, it is known to extrude a light metal profile in the longitudinal direction. Such an extruded light metal profile is also called an extruded profile. After extruding and cutting to length, the extruded profile is then brought to its final configuration by bending and/or press-forming.

A drawback with the aforementioned production method, however, is that the components are generally only produced with a uniform wall thickness and thus in order to achieve the required load-bearing capacity, in particular crash performance, they have a component weight which is consequently too high.

SUMMARY OF THE INVENTION

It is, therefore, the object of the present invention to disclose an impact beam and a method for the production thereof which is optimized in terms of loading and at the same time is optimized in terms of weight and is produced in a particularly cost-effective manner. Additionally, the degree of freedom in terms of construction should be high.

The aforementioned object is achieved according to the invention by an impact beam according to the features in Claim 1.

The method part of the object is also achieved by a method for producing an impact beam according to the features of Claim 11.

Advantageous variants of the present invention form the subject of the dependent claims.

The impact beam is configured as an elongated component. This means that in the longitudinal direction of the impact beam its length is considerably greater than the width and/or depth thereof. In cross section, the impact beam is configured to be profiled. A cross-sectional profile, preferably an open hollow profile, is configured in sections along its length, therefore. The impact beam is produced from a light metal alloy, in particular from an aluminum alloy, wherein a blank and/or light metal profile is produced by means of extrusion molding and/or extrusion. This blank is then treated further by shaping techniques, in particular by press-forming, deep-drawing or tensile compressive deformation, in order to bring the impact beam to its final configuration. In at least two longitudinal portions the impact beam has wall thicknesses which are different from one another. According to the invention, the impact beam is characterized such that the longitudinal direction thereof, also called the longitudinal axis, is oriented transversely to the direction of extrusion.

Within the meaning of the invention, "oriented transversely to the direction of extrusion" means not only at a 90° angle, but also deviating at an angle of a few degrees from 90°. For example, by the subsequent treatment by press-forming techniques the longitudinal axis of the impact beam may extend at an angle of ca. 75° and 105°, in particular between 80° and 100°, relative to the direction of extrusion of the originally extruded light metal profile. By means of the extrusion process, the extruded light metal profile also preferably has a uniform cross-sectional profile. By the subsequent press-forming step, this uniform cross-sectional profile is altered by shaping treatment. The impact beam thus has in the longitudinal direction thereof a variable cross section in sections along its length in the longitudinal direction. Preferably the impact beam is configured over 50% of its longitudinal extent in cross section as an open hollow profile. Moreover, the impact beam preferably has a tensile strength Rm of more than 1000 MPa and/or particularly preferably a yield stress A5 of greater than 5% and/or preferably an angle of bend of between 30° and 60°. Thus it is possible to provide energy dissipation by bending but at the same time to design the impact beam to be rigid. The energy input into an impact beam generally takes place transversely to its longitudinal direction. Thus the impact beam has a high degree of stiffness but at the same time is able to withstand high flexural normal stresses, in particular in the extreme fibers, and dissipate energy in a targeted manner.

According to the invention, it is therefore possible to extrude wall thicknesses which are different from one another in sections along their length, wherein the different wall thicknesses are arranged adjacent to one another transversely to the direction of extrusion. By the extrusion method it is possible in turn to position freely the different wall thicknesses and the transitions located therebetween. The impact beam is produced as an elongated component with a length of more than 50 cm, in particular more than 60 cm, preferably more than 70 cm, particularly preferably more than 80 cm, and in the case of a cross member with a length of more than 90 cm, in particular more than 100 cm, particularly preferably more than 110 cm and quite particularly preferably more than 120 cm.

So that conventional extrusion tools with an extrusion width of up to ca. 100 cm may be used cost-efficiently the extrusion profile, also called the light metal profile, is initially produced with an extrusion width. To this end, an uneven extrusion cross section is produced. In particular, the extrusion cross section is configured as a wave-shaped profile.

After the extrusion, this light metal profile with a wave-shaped extrusion cross section is widened and/or flattened. This may take place in terms of press-forming technology, such that a compressive force is applied from an upper face and a lower face which flattens and/or widens the extruded hollow profile. Also a tensile force may be applied at the side so that the wave-shaped hollow profile in the extrusion cross section is flattened and/or widened by being pulled laterally. Preferably this hollow profile is approximately completely flattened. Thus it is widened from an extrusion width to a working width. The working width is larger than the extrusion width, preferably at least 1.5 times, in particular 2 times, larger than the extrusion width.

Before or after the flattening and/or widening, the light metal profile is cut to length to form individual light metal profile pieces. These individual light metal profile pieces are preferably plate-shaped and are then brought by press-forming to the desired initial or final configuration.

During the press-forming or even after the press-forming a trimming process and/or punching process takes place. Thus the outer peripheral contour may be trimmed. Receiver openings, fastening openings or the like may be stamped out or punched. Moreover, reinforcing beads may be stamped. A cross-sectional plane of the impact beam produced is thus oriented at right angles to the cross-sectional plane of the extrusion cross section of the light metal profile.

Particularly preferably, the impact beam is configured as a cross member. Such a cross member is arranged on the front face or rear face of a motor vehicle. The longitudinal axis of such a cross member is substantially oriented in the motor vehicle transverse direction. The cross member also particularly preferably has an arcuate curvature over its path. In the installed position, however, the arc of the arcuate curvature is thus preferably oriented in the motor vehicle longitudinal direction. This means that, in a cross member which is arranged on the front face, in the installed position the arc is oriented in a curved manner relative to the front of the motor vehicle.

Particularly preferably, the impact beam has a central longitudinal portion also called the central portion, which has a larger wall thickness in comparison with the longitudinal portions adjacent thereto. The central longitudinal portion extends, in particular, over a length of less than 60%, preferably less than 40%, and particularly preferably less than 30% of the length of the impact beam.

Intermediate portions adjoin the central longitudinal portion, followed in turn by terminal portions.

In each case transition portions are formed between the individual portions, thus the terminal portion, intermediate portion or central portion. In the transition portions the wall thickness passes from a larger wall thickness to a smaller wall thickness or from a smaller wall thickness to a larger wall thickness. This preferably takes place in a stepped manner so that according to the principle of a step the wall thickness in longitudinal section through the impact beam changes into a step, and thus a step in the wall thickness is formed. The transition portion in the longitudinal direction thus has a width which is only a few millimeters wide, in particular less than 2 mm, preferably less than 1 mm, wide.

The wall thickness, however, may also change with a progressive, linear or degressive path from a smaller to a larger wall thickness and/or from a larger to a smaller wall thickness. In particular, this is advantageous since initially the extruded light metal profile is widened by flattening. A notch effect and/or crack formation due to the changing wall thickness is thus avoided and the press-forming to the final geometry simplified. Preferably, the transition portion has a width which is oriented in the longitudinal direction of the impact beam and which is less than or equal to three times the larger, adjacent wall thickness. In particular, the width is less than or equal to 1.5 times the larger, adjacent wall thickness.

The wall thickness transition in the impact beam is preferably configured on one side, therefore, on an upper face or lower face. The wall thickness transition may, however, also be configured on an upper face and a lower face.

In the case of a cross member, the terminal portion is preferably configured in two parts. On an outer end of the terminal portion, the wall thickness is configured to be smaller. On a part of the terminal portion oriented toward the central portion, also called the connecting portion, in contrast a larger wall thickness is formed. In this case a connecting region of the cross member is provided on crash boxes and/or longitudinal members. By the larger wall thickness more stability is provided here for mounting the cross member and in the event of a crash the cross member is prevented by the larger wall thickness from being pulled off the crash boxes. A reduced wall thickness is provided in turn toward the outer end of the terminal portion.

In the case of a door impact beam, a larger wall thickness is preferably provided in the terminal portion. The larger wall thickness permits in this case the door impact beam to be mounted with its outer end on the portions in a door frame. In the case of an impact, tensile forces are produced centrally on the door impact beam, so that by the larger wall thickness in the region of the terminal portions the door impact beam has a greater resistance against the fastening points and/or fastening receivers being pulled off. The terminal portion preferably extends over less than ¼, in particular less than ⅙, of the component length.

Moreover, particularly preferably the outer terminal edges of the impact beam, in particular in a door impact beam, extend at an angle not equal to 90° relative to the longitudinal axis. Preferably the angle is configured to be between 60° and 88°, in particular between 70° and 85°. By this measure it is possible to achieve a component length of the impact beam, in particular the door impact beam, wherein the component length is greater than the extrusion width and, in particular, greater than the working width. It is thus possible to produce a component with a component length, wherein the extrusion width is markedly smaller and/or the working width is smaller relative thereto. Micro-crack formation in the material joints, produced during the flattening and/or widening, may be reduced since only a smaller degree of flattening and/or widening is required in order to produce a component of sufficient component length.

The impact beam is particularly preferably formed in one piece and from one material. It has, in particular, a wall thickness which ranges between 1 mm and 6 mm, particularly preferably 1.5 mm to 4 mm. Particularly preferably, thin regions, thus the thinner length portions, have a wall thickness of between 1 mm and 3 mm, preferably 1.5 mm and 2 mm. The thicker regions preferably have a wall thickness of between 3 mm and 6 mm, in particular of 3.5 mm to 5.5 mm, preferably of 4 mm to 5 mm.

The method for producing an aforementioned impact beam is characterized by the following method steps, consisting of:

extruding a light metal profile with an uneven extrusion cross section and an extrusion width,
 widening the extrusion width by flattening and/or pulling to a working width,
 wherein during or after widening, cutting to length takes place to form individual semi-finished products,
 press-forming of the semi-finished product to form the impact beam, wherein before, during or after the press-forming operation a trimming operation is carried out.

The semi-finished products are preferably plate-shaped after being cut to length and/or before the press-forming.

A preferred variant of the method provides that the extrusion profile, in particular after the flattening and/or widening, is trimmed in a direction transversely to the direction of extrusion.

An alternative, particularly preferred variant provides that the extrusion profile is trimmed and/or cut to length at an angle of 90°, in particular at an angle of less than 90° to the extrusion direction. Thus it is possible to achieve a component length which is greater than the working width.

Further advantages, features and aspects of the present invention form the subject of the following description. Preferred variants are shown in the schematic drawings. These drawings serve for clear understanding of the invention, in which:

BRIEF DESCRIPTION OF THE DRAWINGS

FIGS. 2a to 2e show a door impact beam produced by the method shown in FIGS. 1a to 1c;

FIGS. 3a to 3g show a cross member; and,

FIGS. 4a and 4b show a longitudinal section in a partial view relative to a wall thickness transition of an impact beam according to the invention.

DETAILED DESCRIPTION OF THE EMBODIMENTS

Figure 1A:
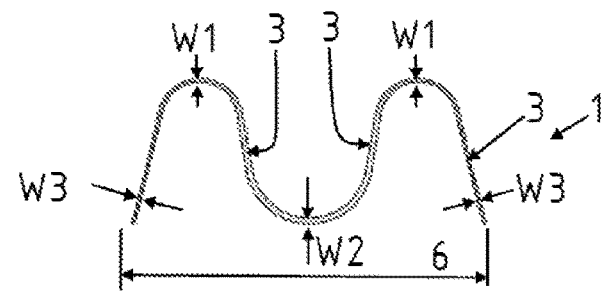
FIGS. 1a to 1c show a production method according to the invention in the individual process steps.

FIGS. 1 a to c show a method according to the invention for producing an extruded profile 1 by flattening and/or widening and separating and/or trimming the semi-finished products 7 produced thereby. According to FIG. 1a, an extruded profile 1 is produced with a wave-shaped and thus uneven cross section. In this case a centrally arranged wall thickness W2 which is larger than an external wall thickness W3 is present as well as a transition therebetween with the variable wall thickness W1 reducing from the wall thickness W2 to the wall thickness W3. The continuous thickness transition from the wall thickness W1 to the wall thickness W3 is thus easily able to be produced due to the extrusion. The change in wall thickness may be formed on only one side, for example the upper face 4, but also on the lower face 5 or on the upper face 4 and on the lower face 5 at the same time. This extruded profile 1 in turn has an extrusion width 6.

Figure 1B:
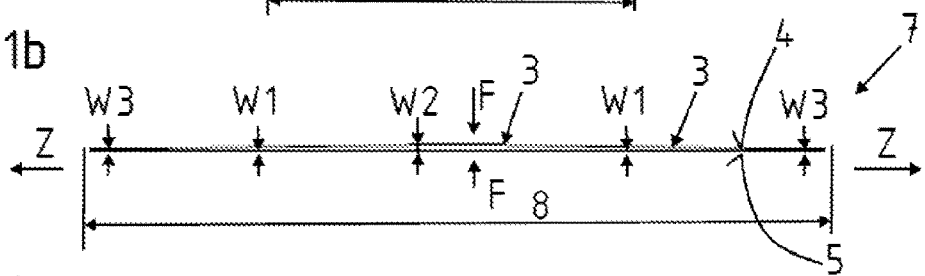

A flattening and/or widening is carried out subsequent to the extrusion shown in FIG. 1b. The flattening and/or widening may be carried out within the scope of the invention by means of a press-forming tool, so that due to a pressing force F acting on the component from above and/or below this component may be widened, but additionally or alternatively due to a tensile deformation, so that the component is widened by a tensile force Z being applied to the end. As a result, by separating the extruded profile 1 into sections semi-finished products 7 in the form of plates are produced with a working width 8 which is greater than the extrusion width 6. These semi-finished products 7 may then be initially stored and/or treated further, in particular by cutting the plates to length. Preferably the semi-finished product 7 is trimmed at an angle α relative to the direction of extrusion so that a component length 10 shown in FIG. 2a may be achieved thereby which is greater than the working width 8. The angle α is particularly preferably between 70° and 90° relative to the direction of extrusion 9. However, it is also possible to produce a trimmed component which is formed transversely to the direction of extrusion 9. In this case, the component length 10 substantially corresponds to the working width 8.

Figure 1C:
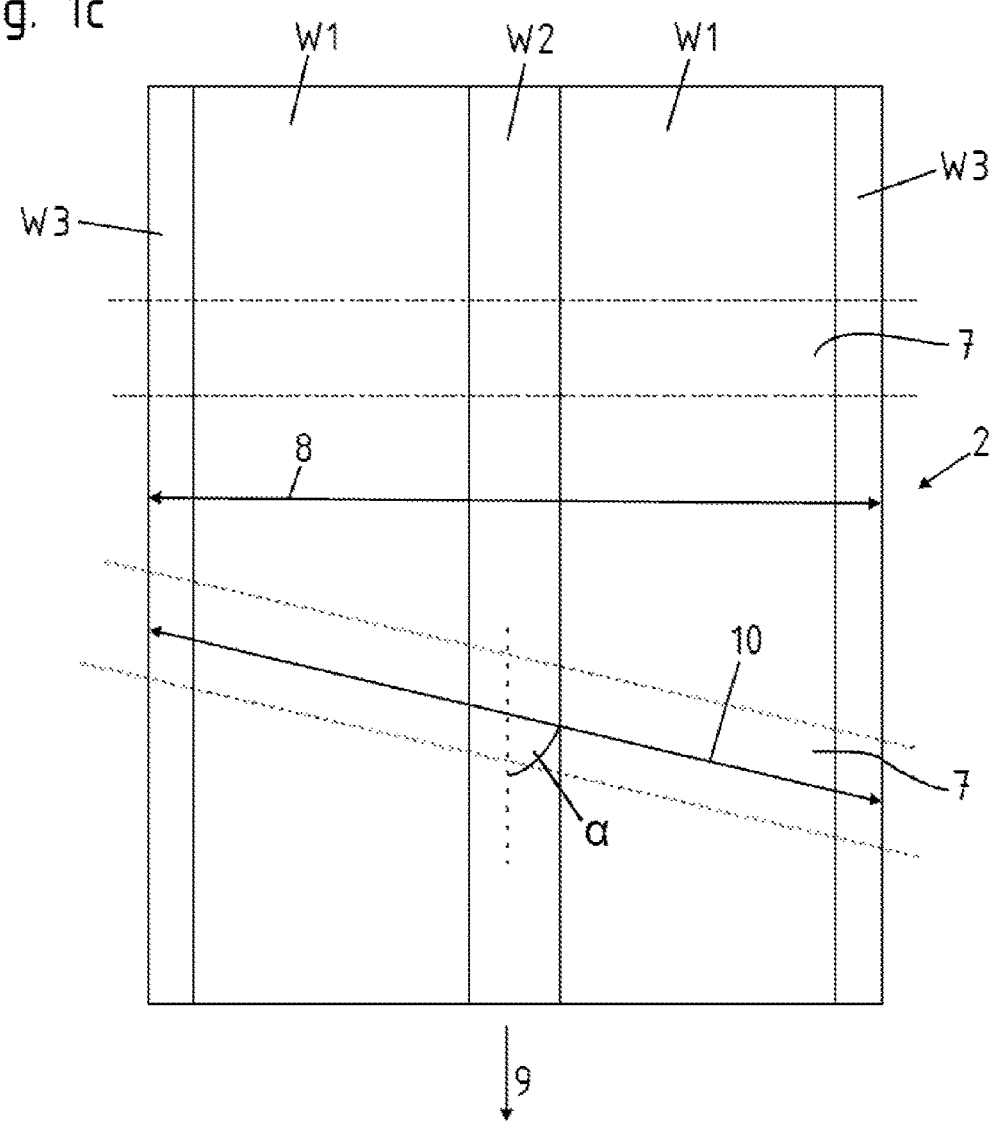

For example, a door impact beam 11 produced in FIGS. 2a to e may be produced by the method sequence shown in FIGS. 1a to c. This door impact beam has a larger wall thickness W2 in a central portion 12 relative to intermediate portions 14 extending from the central portion 12 to the ends 13. In turn, terminal portions 15 of the length L1 which have a larger wall thickness W3 are shown. The central portion 12 is shown in cross section in FIG. 2d, the respective intermediate portion 14 is shown in FIG. 2c in cross section and the terminal portion 15 is shown in FIG. 2e in cross section, in each case according to the cutting line D-D, C-C and E-E. The terminal edges 16 are as a result formed at an angle unequal to 90° relative to a longitudinal direction 17 of the door impact beam 11. The wall thickness transition 3 extends between the individual portions. FIG. 2b shows a perspective view of the door impact beam 11. The terminal portions 15 in each case are flattened. The cross sections in the central portion 12 and in the intermediate portion 14 are in each case configured to be hat-shaped. This takes place by press-forming of the semi-finished product 7 provided according to FIG. 1c.

FIG. 2a shows a plan view, FIG. 2b shows a perspective view and FIGS. 2c, 2d and 2e show a cross-sectional view along the cutting line C-C and D-D and E-E of FIG. 2a. In this case, the wall thicknesses W1, W2 and W3 and the wall thickness transition 3 are located in the door impact beam 11. The component length 10 has been produced in this case as a result of an oblique trimmed portion relative to the direction of extrusion 9 at an angle α and therefore larger than the working width 8 according to FIG. 1. According to FIG. 2b it is clearly visible that after trimming the plate a three-dimensional shaped portion is produced, for example by press-forming.

FIGS. 3d to f show an impact beam according to the invention as a cross member 18 with crash boxes 20 coupled to the cross member. The cross member 18 itself according to FIGS. 3a to c is in this case initially produced from a light metal profile 1, which in the extrusion cross section has an uneven cross section and/or path of the cross section, in particular a wave-shaped and/or W-shaped extrusion cross section. This is flattened according to FIG. 3b and has two wall thicknesses W1, W2 which are different from one another, with one respective wall thickness transition 3 located therebetween. The wall thickness W1 in this case increases toward the wall thickness W2. The wall thickness W2 which is uniform over a central portion 12 is located in a central region. As a result, the cross member is produced by shaping treatment, said cross member in turn having along the cutting line C-C a larger wall thickness W2 relative to the section D-D where a smaller wall thickness W1 is present. In the cross section of the cross member 18, however, the wall thickness in each case is uniformly distributed over the entire cross section. The wall thickness W1 decreases continuously in the longitudinal direction 20 of the cross member 18. According to FIG. 3e, the cross member (18) is configured to be curved in an arcuate manner.

FIG. 4 shows a longitudinal section through an impact beam according to the invention as a cross member 18 or door impact beam 11. A larger wall thickness W2 changes to a smaller wall thickness W1. In the case of FIG. 4a, the wall thickness transition 3 is implemented both on the upper face 4 and on the lower face 5 of the impact beam according to the invention, in the form of a door impact beam 11 or cross member 18. This impact beam also has a transition portion 21 which extends with a width B in the longitudinal direction 17, 20. The width B is less than or equal to 3 times the larger wall thickness W2. The cross-sectional path in the transition portion 21 on the upper face 4 changes progressively to the wall thickness W1 and degressively on the lower face 5.

FIG. 4b also shows a transition portion 21 in the form of a wall thickness step 22 which is not only configured on the upper face 4 but also on the lower face 5. The wall thickness step 22 has, therefore, an extent in the longitudinal direction 17, 20 which is preferably less than or equal to 1 mm. In particular, it is stepped. The wall thickness transitions 3 in FIGS. 4a and b in each case may also be configured only on an upper face 4 or only on a lower face 5.

LIST OF REFERENCE NUMERALS

1—Light metal profile
2—Semi-finished product
3—Wall thickness transition
4—Upper face
5—Lower face
6—Extrusion width
7—Semi-finished product
8—Working width
9—Direction of extrusion
10—Component length
11—Door impact beam
12—Central portion
13—End
14—Intermediate portion
15—Terminal portion
16—Terminal edge
17—Longitudinal direction
18—Cross member
19—Crash box
20—Longitudinal direction at 18
21—Transition portion
22—Wall thickness step
B—Width at 21
F—Pressing force
L1—Length at 15
W1—Wall thickness
W2—Wall thickness
W3—Wall thickness
Z—Tensile force

The invention claimed is:

1. An impact beam for a motor vehicle, configured as an elongated shaped component and produced from an extruded light metal profile, wherein
the impact beam has at least two longitudinal portions in a longitudinal direction thereof with different wall thicknesses from one another,
the light metal profile is extruded in a direction of extrusion transversely to the longitudinal direction of the impact beam and is shaped after the extrusion,
the impact beam is elongated in the longitudinal direction at an angle between 80° and 100° relative to the direction of extrusion,
the impact beam has, at least in sections along a length of the impact beam, one of a C-shaped, U-shaped, W-shaped or hat-shaped open hollow cross-sectional profile, and
the impact beam has an arcuate curvature over the length of the impact beam.

2. The impact beam according to claim 1, wherein the impact beam is a door impact beam.

3. The impact beam according to claim 1, wherein
the at least two longitudinal portions include a central portion extending over less than 50%, of the length of the impact beam, and
the central portion has a wall thickness which is at least 1.3 times larger than a wall thickness of another portion of the at least two longitudinal portions.

4. The impact beam according to claim 1, wherein at least one terminal portion of the impact beam has a larger wall thickness relative to an intermediate portion adjacent to the terminal portion.

5. The impact beam according to claim 1, wherein
the at least two longitudinal portions include a terminal portion and a central portion,
the terminal portion has
an outer end which is a free end, and
an inner end which is a connecting portion oriented toward the central portion, and
a wall thickness of the connecting portion is greater than that of the outer end.

6. The impact beam according to claim 1, wherein
the at least two longitudinal portions include
a central portion, and
a terminal portion which has a wall thickness smaller than a wall thickness of the central portion,
the impact beam further includes a transition portion between the central portion and the terminal portion, and
the transition portion has a width in the longitudinal direction of the impact beam, and the width of the transition portion is less than or equal to 3 times the wall thickness of the central portion.

7. The impact beam according to claim 6, wherein the transition portion on a lower face of the impact beam extends in the longitudinal direction from the terminal portion towards the central portion in a degressive manner.

8. The impact beam according to claim 1, wherein the different wall thicknesses are configured on upper and lower faces of the impact beam.

9. The impact beam according to claim 1, wherein a terminal edge of the impact beam extends at an angle of less than 90 degrees relative to the longitudinal direction of the impact beam.

10. The impact beam according to claim 3, wherein
the central portion extends over less than 30% of the length of the impact beam, and
the wall thickness of the central portion is at least 1.8 times larger than the wall thickness of said another portion of the at least two longitudinal portions.

11. The impact beam according to claim 1, wherein
the at least two longitudinal portions include
a central portion, and
a terminal portion which is directly adjacent the central portion, and has a wall thickness smaller than a wall thickness of the central portion, and
a transition from the central portion to the terminal portion is a wall thickness step.

12. The impact beam according to claim 6, wherein the transition portion on an upper face of the impact beam extends in the longitudinal direction from the terminal portion towards the central portion in a progressive manner.

13. The impact beam according to claim 1, wherein a terminal edge of the impact beam extends at an angle between 75 and 85 degrees relative to the longitudinal direction of the impact beam.

14. The impact beam according to claim 1, wherein the impact beam is a cross member for a motor vehicle.

\* \* \* \* \*